United States Patent
Andersen et al.

(10) Patent No.: US 11,988,627 B2
(45) Date of Patent: May 21, 2024

(54) SOLID-CONTACT ION-SELECTIVE ELECTRODE

(71) Applicant: Unisense A/S, Aarhus N (DK)

(72) Inventors: Mikkel Holmen Andersen, Galten (DK); Kristian Bastholm Knudsen, Risskov (DK)

(73) Assignee: Unisense A/S, Aarhus N (DK)

( * ) Notice: Subject to any disclaimer, the term of this patent is extended or adjusted under 35 U.S.C. 154(b) by 0 days.

(21) Appl. No.: 18/272,737

(22) PCT Filed: Feb. 8, 2022

(86) PCT No.: PCT/EP2022/052947
§ 371 (c)(1),
(2) Date: Jul. 17, 2023

(87) PCT Pub. No.: WO2022/171593
PCT Pub. Date: Aug. 18, 2022

(65) Prior Publication Data
US 2024/0035999 A1    Feb. 1, 2024

(30) Foreign Application Priority Data
Feb. 9, 2021 (EP) .................................... 21156045

(51) Int. Cl.
*G01N 27/333* (2006.01)
(52) U.S. Cl.
CPC ................... *G01N 27/333* (2013.01)

(58) Field of Classification Search
CPC ........................... G01N 27/333; G01N 27/302
See application file for complete search history.

(56) References Cited

U.S. PATENT DOCUMENTS

| 2016/0077042 A1 | 3/2016 | Warwick et al. |
| 2018/0024087 A1 | 1/2018 | Hu et al. |
| 2019/0310224 A1 | 10/2019 | Wilhelm |

FOREIGN PATENT DOCUMENTS

| EP | 0 021 595 A1 | 1/1981 |
| EP | 3 054 290 A1 | 8/2016 |
| EP | 3 351 931 A1 | 7/2018 |
| JP | S60 257353 A | 12/1985 |
| WO | 98/09160 A1 | 3/1998 |
| WO | 01/65247 A1 | 9/2001 |
| WO | 2014/138110 A1 | 9/2014 |

OTHER PUBLICATIONS

Zhao et al., Graphdiyne oxide enhances the stability of solid contact-based ion-selective electrodes for excellent in vivo analysis, Science China—Chemistry Oct. 2019 vol. 62 No. 10: 1414-1420 (Year: 2019).*

(Continued)

*Primary Examiner* — Alexander S Noguerola
(74) *Attorney, Agent, or Firm* — J. Peter Paredes; Amin Wasserman Gurnani, LLP (57) ABSTRACT

The present invention relates to a Solid-Contact Ion-Selective Electrode (SC-ISE) and a method of producing a SC-ISE. The SC-ISE of the invention comprises at least one transition metal in a mixed redox state and is suitable for long-term deployment having a long term stability and thus limited need for calibration.

12 Claims, 8 Drawing Sheets

(56) References Cited

OTHER PUBLICATIONS

Lenar et al., Ruthenium Dioxide as High-Capacitance Solid-Contact Layer in K+—Selective Electrodes Based on Polymer Membrane, Journal of the Electrochemical Society, 166(15) B147-B1476 (2019) (Year: 2019).*
International Preliminary Examining Authority/EPO, International Preliminary Report on Patentability issued in corresponding application PCT/EP2022/052947 dated May 23, 2023 (10 pages).
International Searching Authority/EPO, International Search Report and Written Opinion issued in corresponding application PCT/EP2022/052947 dated Apr. 28, 2022 (16 pages).
Komaba, S., et al. "All-solid-state ion-selective electrodes with redox-active lithium, sodium, and potassium insertion materials as the inner solid-contact layer", Analyst, 142(20), 3857-3866 (2017).
Nikolskii, B.P., et al. "Solid Contact in Membrane Ion-Selective Electrodes", Ion-Selective Electrode Reviews, vol. 7, 1985, pp. 3-39 (1985).
Shao, Y., et al. "Recent advances in solid-contact ion-selective electrodes: functional materials, transduction mechanisms, and development trends", Chem. Soc. Rev., 49, 4405-4465 (2020).
European Patent Office, Extended European Search Report issued in corresponding EP Patent Application No. 21156045.3 dated Jul. 16, 2021 (8 pages).

* cited by examiner

SOLID-CONTACT ION-SELECTIVE ELECTRODE

FIELD OF THE INVENTION

The present invention relates to an ion-selective electrode and a method of producing an ion-selective electrode.

BACKGROUND OF THE INVENTION

Ion-selective electrodes have been used in a wide range of fields such as biology, medical, and environmental, as an easy and convenient method to generate an electromotive force in accordance with the concentration of a target ion to be measured by merely contacting a reference electrode with a sample solution.

Many ion-selective electrodes use a polymer or glass type ion sensitive film that includes an ionophore, or other ionic conductive properties, which selectively binds to a target ion that in turn can be measured. By bringing one side of the ion sensitive film into contact with an internal liquid containing a fixed concentration of the target ion to be measured, and bringing the other side into contact with a sample solution of an unknown concentration, a potential is generated between both solutions in accordance with the concentration ratio. An internal liquid type ion-selective electrode (IF-ISE; Inner-filling type Ion-selective electrode) utilize such principle.

Another type of ion-selective electrode is the solid-contact ion-selective electrode (SC-ISE) in which a sensitive film in contact with a solid internal electrode is often used to eliminate the presence of an internal liquid.

Commercial solutions of multiple SC-ISE sensor already exists. However, none of these solutions are suitable for long-term deployment as frequent calibration are required. Indeed, current commercial solution requires continuous matrix and calibration adjustments, periodic calibration to assure high performance for successful monitoring. The accuracy of current sensors relies on non-trivial maintenance practices and frequent calibration near the temperature of measurement or operation.

A physical change to any of the sensor's layers contribute to a drift in the linear calibration curve, i.e., potential vs. log of target ion concentration.

It is believed that a major contributor to the drift, in a large number of sensors, originates from changes at the transducer interface, e.g., decomposition of functional groups yielding in a loss of charge transfer sites for faradaic type transducers and a change in double-layer charge compensation for non-faradaic transducers.

Loss of plasticizer, lipophilic salts, and ionophore in the ISM are also considered contributors to the drift.

Hence there is a need for SC-ISE solutions that allows long-term deployment by the reduction of downtime mitigated by a minimized calibration frequency.

A SC-ISE showing long term stability and low voltage drift per day would thus be advantageous.

OBJECT OF THE INVENTION

An object of the present invention is to provide an ion-selective electrode that displays long-term stability and a method of producing an ion-selective electrode.

A further object of the invention may be seen as the provision of an ion-selective electrode having no need for frequent calibration thus SC-ISE having a long term stability having a limited need for calibration thus suitable for long-term deployment.

An object of the present invention may also be seen as to provide an alternative to the prior art.

In particular, it may be seen as an object of the present invention to provide an ion-selective electrode having long term stability that solves the above-mentioned problems of the prior art by having a low voltage drift per day.

SUMMARY OF THE INVENTION

Thus, the above-described object and several other objects are intended to be obtained through an ion-selective electrode comprising: an ion selective membrane configured to be in contact with a solution to be measured; a transducer layer in contact with the ion selective membrane; a conductive electrode in contact with the transducer layer.

The ion-selective electrode of the invention shows low voltage drift per day providing a long term stability ion-selective electrode.

This is achieve through the combination of the features of the first aspect of the invention, namely the selective membrane, the transducer layer, and the conductive electrode.

The ion-selective electrode of the invention may be a Solid-Contact Ion-Selective Electrode (SC-ISE), i.e., an all solid-state ISE comprising three essential elements: the conductive electrode or current collector (CC), the ion-to-electron transducer or transducer layer and the ion-selective membrane or ion sensitive membrane (ISM).

The transducer layer or simply transducer is an essentially feature of the invention.

The transducer layer is an interlayer between the ISM and the CC having the function of converting ionic charge carriers into the output electronic potential measured by the electrode.

The transducer layer may comprise transition metal oxides.

In some embodiments, the transition metal oxides comprise at least one transition metal in a mixed redox state.

In some other embodiments, the transition metal oxides comprise solid-state transition metal oxides.

The SC-ISE may thus comprise a solid state redox couple that is independent on the type of target ion to be measured.

The SC-ISE may comprise transition metal oxides as transducer layer that have an internal solid-state redox event that is independent of the target ion measured by the sensor at the ion-selective membrane and sample interface. The transducer's internal redox event maintains the sensors standard potential while the ion-to-electron transduction is believed to occur through a non-faradaic pathway.

The presence of a stable mixed redox state transition metal oxides produces a low voltage drift per day and thus provides long term stability. In that, the advantage of having solid-state redox sites is an improvement of long-term stability that in turn limits the SC-ISE voltage drift.

In some further embodiments, the transition metal oxides have the general formula $A_xB_yO_z$, wherein A is an element or a combination of elements of group 1, 7, 8, 9, 10, or 12, wherein B is an element or a combination of elements of group 7, 8, 9, or 10 and wherein x is a number between 0 and 1, y is a number between 1 and 3 and z is a number between 1 and 4.

The x, y and z numbers may be integers or decimal numbers.

The reference to the group names relates to the new IUPAC group names as to the IUPAC Periodic Table of Elements release 1 Dec. 2018.

The transition metal oxides may comprise a redox couple or a combination of redox couples wherein B, being an element or a combination of elements of group 7, 8, 9, or 10 has a mixed redox state II/III, i.e., $B^{2+}/B^{3+}$.

In some embodiments, the transition metal oxides comprise a redox couple or a combination of redox couples selected from $Mn^{2+}/Mn^{3+}$, $Co^{2+}/Co^{3+}$, $Ni^{2+}/Ni^{3+}$, and $Fe^{2+}/Fe^{3+}$.

For example, transition metal oxides that can be used in the transducer layer are $Fe_3O_4$, $Co_3O_4$, $Mn_3O_4$, $ZnFe_2O_4$, $CoFe_2O_4$, $NiFe_2O_4$, $MnFe_2O_4$, $LiCo_2O_4$, $FeCo_2O_4$, $NiCo_2O_4$, $MnCo_2O_4$, $LiMn_2O_4$, $NiMn_2O_4$, $FeMn_2O_4$, $NiMn_2O_4$, and $(Fe,Mn)_3O_4$ These metal oxides contain a mixture of the oxidized and reduced form (III/II) of one or more transition metals thus providing the mixed redox state ensuring long term stability.

These metal oxides have a spinel structure and display a closed-packed face-centred cubic arrangement of oxide ions.

For all spinel materials the increased sensor stability originates from the well-defined redox site of the cations that have a distribution of redox states II/III.

Thus, the transition metal oxides of the transducer layer may be crystalline transition metal oxides.

For example, the crystalline transition metal oxides of the transducer layer may be spinel crystal structures with a mixed redox state.

The SC-ISE according to some embodiments of the invention displays long-term stability mainly due to the introduction of a transition metal oxide (TMO) as the ion-to-electron transducing layer for aqueous applications. This layer significantly reduces sensor drift compared to other known materials currently employed in state of the art ISE and allow for the provision of long-term deployable sensors.

The ISM is responsible for ion selectivity through an induced potential drop across the solution to be measure and the ISM interface.

The ISM is configured to be in contact with a solution to be measured, i.e., is configured or adapted to be in contact with a solution to be measured during operation.

In some embodiments, the ion selective membrane is sensitive to a Group 1 element ion, a Group 2 element ion, a Group 17 element ion, ammonium ion, nitrate ion, nitrite ion, sulphate ions, or phosphate ions.

The ISM is sensitive or has as target ion a Group 1 element ion, a Group 2 element ion, a Group 17 element ion, ammonium ion, nitrate ion, nitrite ion, sulphate ions, or phosphate ions.

The ion-selectivity of the ion-selective electrode is controlled by the composition of the ion selective membrane and may thus be selective to one or more ions selected from the list: $NO_3^-$, $NO_2^-$, $Cl^-$, $Br^-$, $HSO_4^-$, $SO_4^{2-}$, $H_2PO_4^-$, $HPO_4^{2-}$, $PO_4^{3-}$, $NH_4^+$, $H^+$, $K^+$, $Na^+$, and $Li^+$.

The ISM may comprise of polymeric materials such as polyvinyl chloride (PVC), polypropylene (PP), as poly(vinylidene fluoride) (PVDF) as mechanical support to the membrane. The ISM may also comprise plasticizers allowing for the solubility of lipophilic salts that provide the ISM with sufficient ionic conductivity and an ionophore that accounts for the ion-selective character of the membrane.

The combination of the ionically independent solid-state redox couple of the transducer together with the ion selective membrane produces a long-term stability of the ion-selective electrode ensuring a low voltage drift.

The advantage of a long-term stabile ion-selective electrode output signal through the combined presence of the solid-state redox couple, inside the transition metal oxide, which is independent of target ion type and allows for a significant decrease in signal drift, thus reducing the frequency of calibration, lowering running costs, and operational downtime.

The CC has to be in contact with the transducer layer, ensuring electronic conduction with a low impedance. Example of CCs are glassy-carbon electrodes, thin metallic conductors, wires, or conductive pastes.

In some embodiments, the ion-selective electrode further comprises means for encapsulating the conductive electrode.

In some further embodiments, the means for encapsulating is or comprises a non-electronically, non-ionically conductive inert material covering said conductive electrode and leaving said conductive electrode exposed to said transducer layer.

For example, the means for encapsulating may be, but not limited to, a glass or quartz tube surrounding the conductive electrode and leaving the conductive electrode exposed to the transducer layer.

Exposure to the conductive electrode to the transducer layer is necessary so as to ensure electronic conduction.

In some embodiments, the ion-selective electrode further comprises a hydrophobic layer located between the transducer layer and the means for encapsulating the conductive electrode.

In some other embodiments, the hydrophobic layer may be located between the ion-selective membrane and the means for encapsulating the conductive electrode.

Silanes may refer to many compounds with four substituents on silicon, including an organosilicon compound, e.g., $SiHCl_3$, $Si(CH_3)_4$ and $Si(OC_2H_5)_4$.

During operation sample solution penetration may cause membrane delamination in particular at the interface between the transducer layer and the means for encapsulating the conductive electrode or between the ion selective membrane and the means for encapsulating the conductive electrode.

The presence of a hydrophobic layer or coating have shown the advantage of reducing delamination after several months of continuous submersion. The presence of the hydrophobic layer improves the stability of the adhesion between the transducer layer or the ISM and the means for encapsulating the CC.

It has been also found that roughening of the surface of the means for encapsulating the CC further improves the adhesion of the hydrophobic layer.

The hydrophobic layer may comprise silane, styrene, methacrylate, ethers, carboxylate, or acetate compounds or a combination thereof.

In a second aspect the invention relates to a method of producing an ion-selective electrode according to the first aspect of the invention, the method comprising: encapsulating the conductive electrode; coating the encapsulated conductive electrode with the transducer layer; and subsequently coating the transducer layer with the ion selective membrane.

The coating onto the transducer layer may occur through several intermittent dip coating processes separated by drying periods leading to a full coverage of the transducer layer with the ISM.

The formation of the transducer layer may also be achieved by one or more dip-coating steps separated by drying periods in-between.

In some embodiments, the method according to second aspect of the invention further comprises roughening and silanizing the means for encapsulating the conductive electrode following said encapsulating the conductive electrode.

Roughening and silanizing the external surface, i.e., the surface in contact with the transducer layer or with the ISM, of the means for encapsulating the conductive electrode has the function of improving the surface adhesion of the subsequently deposited transducer layer or ISM.

Alternative procedures of fabrication of SC-ISEs may be blade coating, screen printing, spin- or spray coating.

Blade Coating

SC-ISE may be produced onto flat surfaces by performing a sequential coating of transducer slurry and ISM solution. Different application procedures may be utilized to coat an inert metal foil, e.g. Pt, Ag, Au, Cu, or Al, with the transducer slurry and subsequent ISM such as doctor-blade-, slot die-, and reverse roll-coating. The procedure may be continuous or intermittent, use single- or multiple passes, and the electrode may be dried in-between subsequent coatings. The procedure may utilize calendaring of the transducer material prior to application of the ISM solution. The sandwich-like structure may then be cut, punched, or slitted into appropriate geometrical shapes that fit into a sensor tip that ensure an electronic contact to the sensing equipment.

Screen Printing

In a similar fashion to the procedure of blade coating, the solutions may be screen printed through a screen with an appropriate mesh size and pattern. The desired pattern may be controlled by the application of a photo sensitive emulsion.

Spin- or Spray Coating

Another possible method to produce the ion-sensitive electrode of the invention is the utilization of spin or spray coating, for example in a subsequent fashion as stated in the above procedures.

The first and other aspects and embodiments of the present invention may each be combined with any of the other aspects and embodiments. These and other aspects of the invention will be apparent from and elucidated with reference to the embodiments described hereinafter.

BRIEF DESCRIPTION OF THE FIGURES

The ion-selective electrode and a method of producing an ion-selective electrode according to the invention will now be described in more details with regard to the accompanying figures. The figures show one way of implementing the present invention and are not to be construed as being limiting to other possible embodiments falling within the scope of the attached claim set.

DETAILED DESCRIPTION OF AN EMBODIMENT

Figure 1:
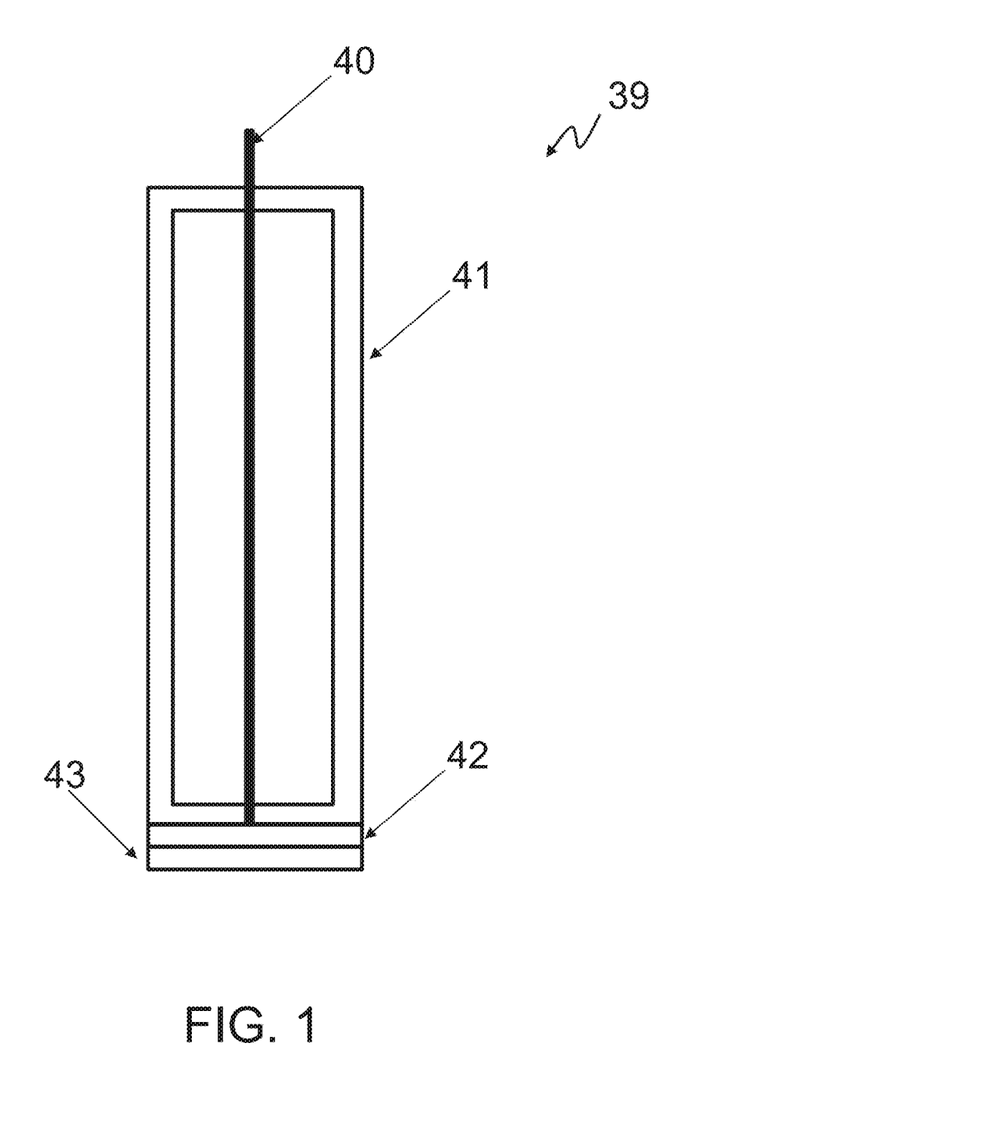
FIG. 1 is a schematic illustration of the ion-selective electrode according to some embodiments of the invention.

FIG. 1 is a schematic illustration of the ion-selective electrode 39 according to some embodiments of the invention.

The ion-selective electrode 39 comprises a conductive electrode 40 exposed to and in contact with an ion-to-electron transducer layer 42 that converts ionic charge carriers into the output electronic potential.

The ISM 43 responsible for ion selectivity through an induced potential drop across the sample/ISM interface and is located onto the transducer layer 42.

The conductive electrode 40 is encapsulated inside a non-electronically, non-ionically conductive inert material 41.

Figure 2:
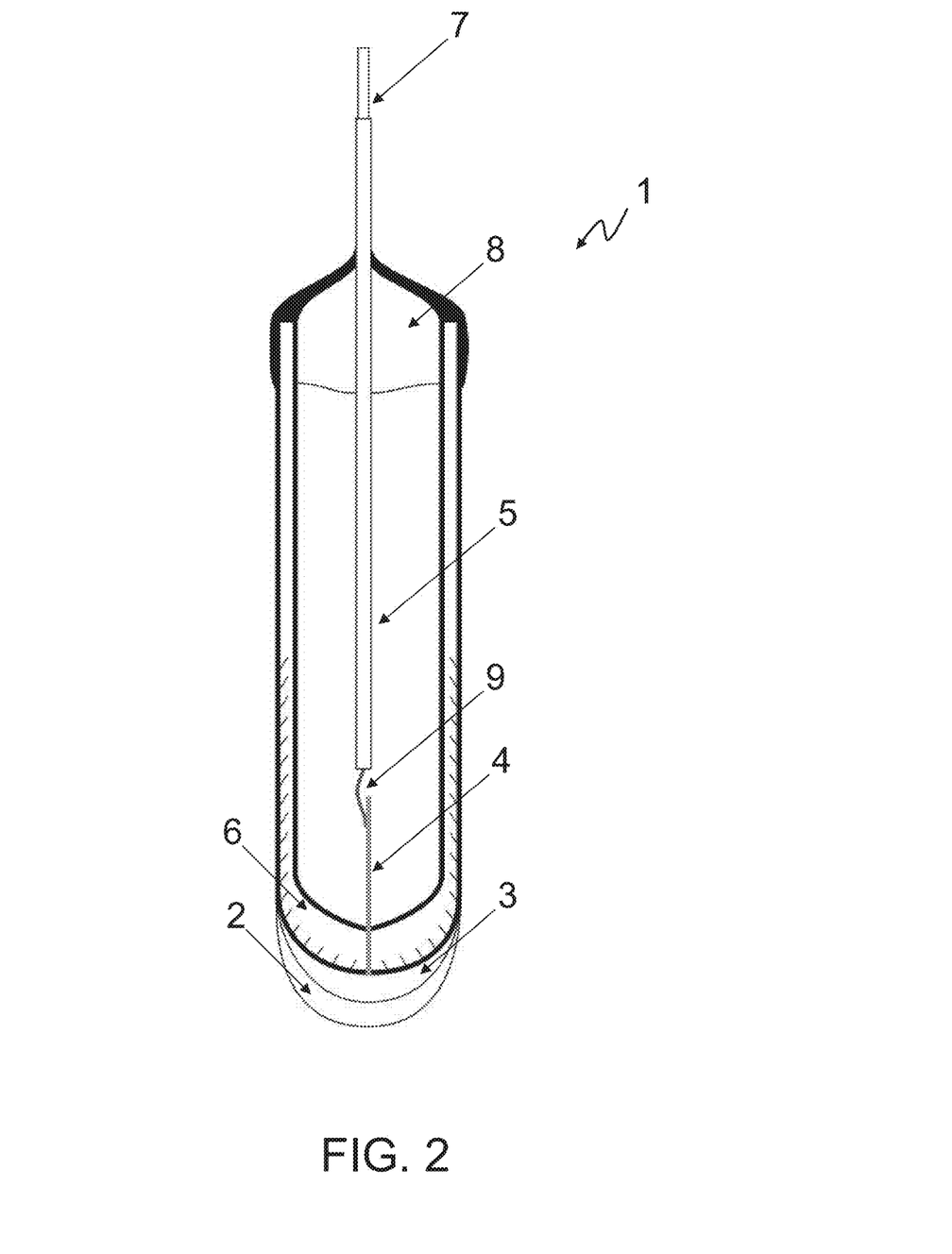
FIG. 2 is a schematic illustration of the ion-selective electrode according to some other embodiments of the invention.

FIG. 2 is a schematic illustration of the ion-selective electrode 1 according to some embodiments of the invention.

The solid-contact ion-selective electrode 1 comprises a conductive electrode, i.e., a Pt wire 4, which is connected to a contact wire 5 through a solder 9 ensuring electronic conduction.

The electronic conduction is further ensured by the contact 7.

In the embodiment of FIG. 2, the contact wire 5 is encapsulated inside a quartz tubing 6 and kept in place by a shrink tube and glue 8.

The Pt wire 4 is exposed to and in contact with an ion-to-electron transducer layer 3 that converts ionic charge carriers into the output electronic potential.

The ISM 2 responsible for ion selectivity through an induced potential drop across the sample/ISM interface and is located onto the transducer layer 3.

Figure 3:
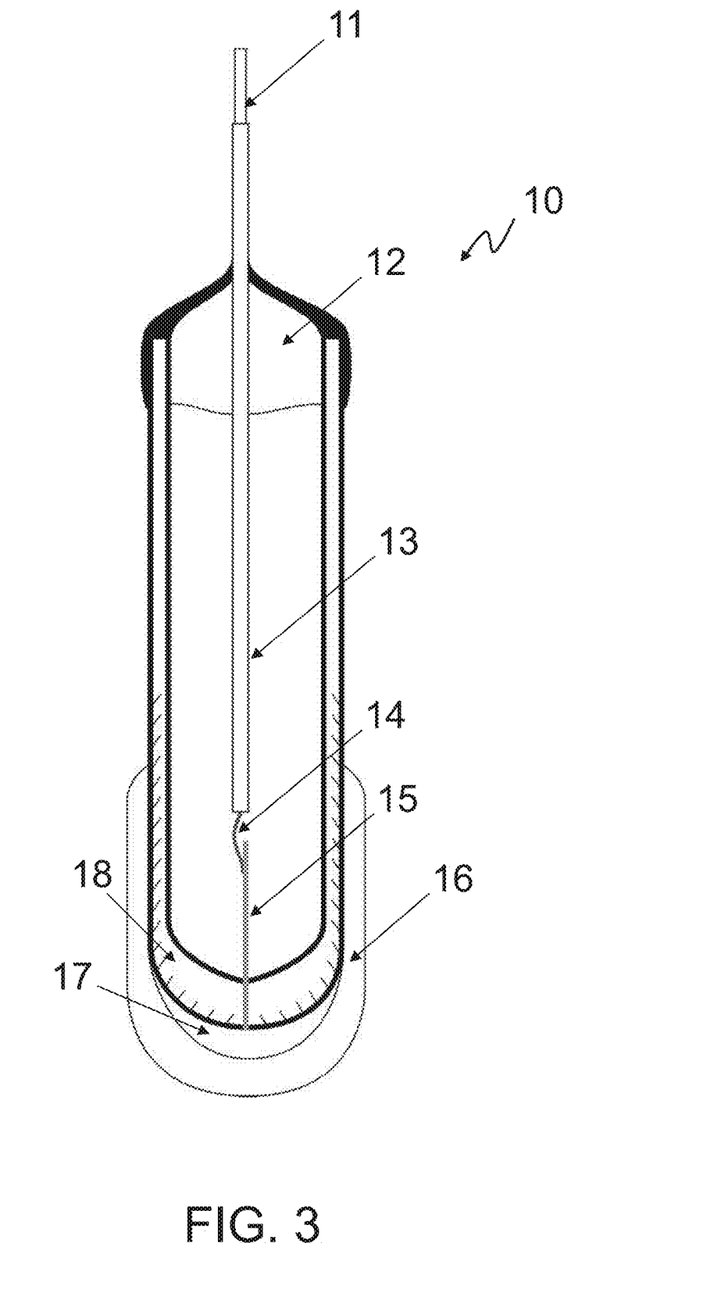
FIG. 3 is a schematic illustration of the ion-selective electrode according to some further embodiments of the invention.

FIG. 3 is a schematic illustration of the ion-selective electrode 10 according to some other embodiments of the invention.

The ion-selective electrode 10 comprises a conductive electrode, i.e., a Pt wire 15, which is connected to a contact wire 13 through a solder 14 ensuring electronic conduction.

The electronic conduction is further ensured by the contact 11.

In the embodiment of FIG. 3, the contact wire 13 is encapsulated inside a quartz tubing 18 and kept in place by a shrink tube and glue 12.

The Pt wire 15 is exposed to and in contact with an ion-to-electron transducer layer 17 that converts ionic charge carriers into the output electronic potential.

The ISM 16 responsible for ion selectivity through an induced potential drop across the sample/ISM interface and is located onto the transducer layer 16, which is in contact with the external surface of the quartz tubing 18.

The transducer layer 17 is further protected from possible delamination by the presence of the ISM 16 in contact with the external surface of the quartz tubing 18.

Figure 4:
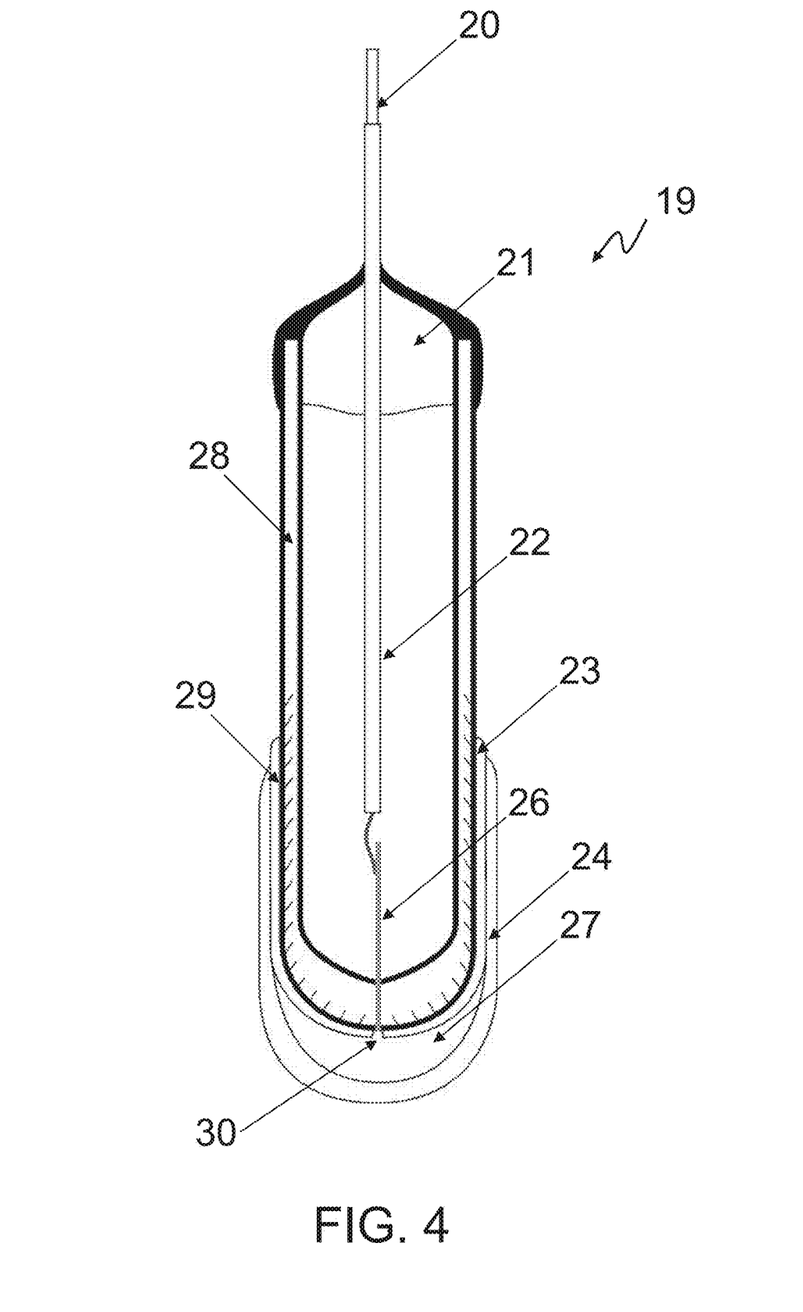
FIG. 4 is a schematic illustration of the ion-selective electrode comprising a hydrophobic layer or coating according to some embodiments of the invention.

FIG. 4 is a schematic illustration of the ion-selective electrode 19 according to some embodiments of the invention.

The ion-selective electrode 19 comprises a conductive electrode, i.e., a Pt wire 26, which is connected to a contact wire 22 through a solder ensuring electronic conduction.

The electronic conduction is further ensured by the contact 20.

In the embodiment of FIG. 4, the contact wire 22 is encapsulated inside a quartz tubing 28 and kept in place by a shrink tube and glue 21.

The embodiment of FIG. 4 is characterized by the presence of a hydrophobic layer 23 located between the external surface 29 of the quartz tubing 28 and the ion-to-electron transducer layer 27.

The hydrophobic layer 23 ensure superior adhesion between the underneath transducer layer 27 and ISM 24 and the external surface 29 of the quartz tubing 28 avoiding water penetration and membrane delamination at the external surface 29.

The external surface 29 of the quartz tubing 28 may be roughened and silanized to further improve adhesion of the hydrophobic layer 23.

The Pt wire 26 is exposed to and in contact with an ion-to-electron transducer layer 27 through the opening 30 within the hydrophobic layer 23.

The hydrophobic layer 23 of the embodiment of FIG. 4 may be vinyl-terminated polystyrene or may comprise silane, styrene, methacrylate, ethers, carboxylate, or acetate compounds or a combination thereof.

The transition metal oxides in any of the ion-selective electrodes 1, 10 or 19 of FIGS. 1, 2 and 3 may be selected from the one collected in table 1.

Table 1 illustrates examples of transition metal oxides with solid-state redox site that can be utilized in transducer layers according to some embodiments of the invention.

TABLE 1

Metal oxides with solid-state redox site

| Material | Redox active site |
|---|---|
| $Fe_3O_4$ | Fe(II/III) |
| $ZnFe_2O_4$ | Fe(II/III) |
| $CoFe_2O_4$ | Fe(II/III) |
| $NiFe_2O_4$ | Fe(II/III) |
| $MnFe_2O_4$ | Fe(II/III) |
| $Co_3O_4$ | Co(II/III) |
| $LiCo_2O_4$ | Co(II/III) |
| $FeCo_2O_4$ | Co(II/III) |
| $NiCo_2O_4$ | Co(II/III) |
| $MnCo_2O_4$ | Co(II/III) |
| $Mn_3O_4$ | Mn(II/III) |
| $LiMn_2O_4$ | Mn(II/III) |
| $NiMn_2O_4$ | Mn(II/III) |
| $FeMn_2O_4$ | Mn(II/III) |
| $NiMn_2O_4$ | Mn(II/III) |
| $(Fe,Mn)_3O_4$ | Fe(II/III) - Mn(II/III) |

Figure 5A:
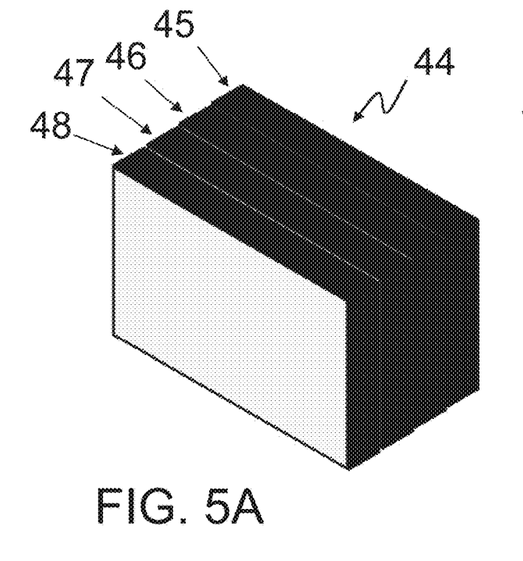
FIGS. 5a and 5b are schematic illustrations of the ion-selective electrode according to some embodiments of the invention.

FIG. 5a is a schematic illustrations of the ion-selective electrode 44 according to some embodiments of the invention.

Figure 5B:
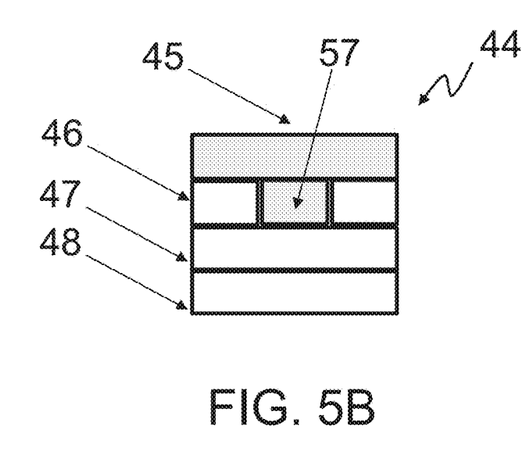

FIG. 5b is a cross section of the ion-selective electrode 44 of FIG. 5a.

FIGS. 5a and 5b show an embodiment in which the ion-selective electrode 44 is manufactured onto flat surfaces, e.g., by performing a sequential coating. An inert metal foil or sheet 45, e.g. Pt, Ag, Au, Cu, Ti, Ni, or Al, is coated with the transducer slurry producing a transducer layer 47 and subsequently with a ISM 48.

A hydrophobic coating 46 is present between the transducer layer 47 and the metal foil 45. A perforation 57 within the hydrophobic coating 46 allows for a conductive contact between the transducer layer 47 and the metal foil 45.

The sandwich-like structure of the ion-selective electrode 44 has the advantage that can be cut, punched, or slitted into appropriate geometrical shapes that fit into a sensor tip that ensure an electronic contact to the sensing equipment.

Figure 5C:
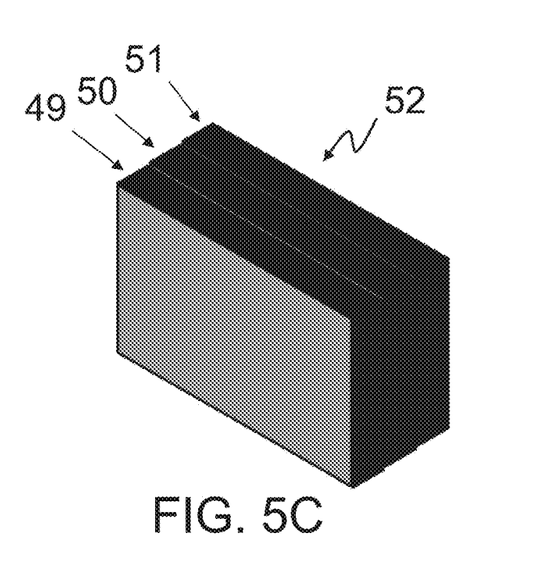
FIGS. 5c and 5d are schematic illustrations of the ion-selective electrode according to some other embodiments of the invention.

FIG. 5c is a schematic illustrations of the ion-selective electrode 52 according to some embodiments of the invention.

Figure 5D:
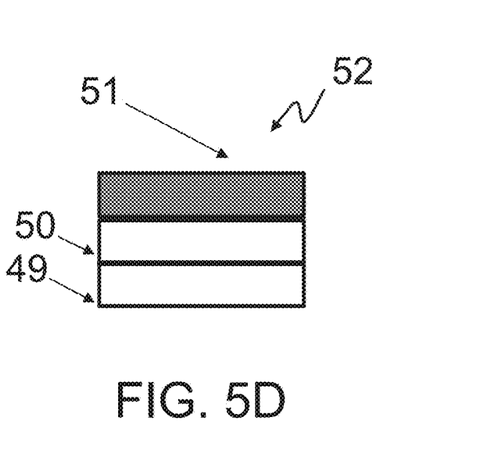

FIG. 5d is a cross section of the ion-selective electrode 52 of FIG. 5c.

FIGS. 5c and 5d show an embodiment in which the ion-selective electrode 52 is constructed onto flat surfaces, e.g., by performing a sequential coating. An inert metal foil or sheet 51, e.g. Pt, Ag, Au, Cu, Ti, Ni, or Al, is coated with the transducer slurry producing a transducer layer 50 and subsequently with a ISM 49.

Also the sandwich-like structure of the ion-selective electrode 52 has the advantage that can be cut, punched, or slitted into appropriate geometrical shapes that fit into a sensor tip that ensure an electronic contact to the sensing equipment.

Figure 6:
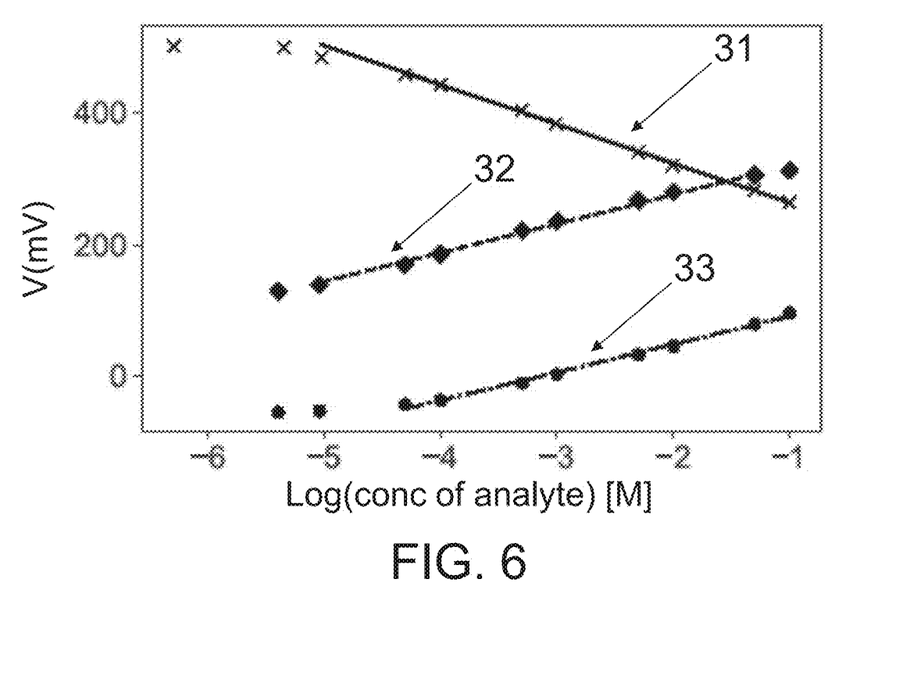
FIG. 6 is a graph of calibration curves of three different analytes measured independently using the ion-selective electrode according to some embodiments of the invention.

FIG. 6 is a graph of calibration curves of three different analytes measured independently.

The calibration curves of FIG. 6 relate to a potentiometric sensor comprising the ion-selective electrode according to some embodiments of the invention and a reference electrode being an Ag/AgCl reference electrode.

The sensor is a potentiometric sensor, i.e., measures the concentration at the interface of the ion-selective electrode and between the ion-selective electrode and the reference electrode.

The calibration curves 31, 32, and 33 show log of concentration of analyte in the solution to be measured versus the voltage measured for three different ions, i.e., $NO_3^-$, $NH_4^+$, and $K^+$, respectively.

The calibration curves 32 and 33 relate to sensors having an ion-selective electrode comprising $LiMn_2O_4$ within the transducer layer measuring $NH_4^+$, i.e., 32 and $K^+$, i.e., 33.

The calibration curve 31 relates to a sensor having an ion-selective electrode comprising $Mn_3O_4$ within the transducer layer measuring $NO_3^-$.

Figure 7:
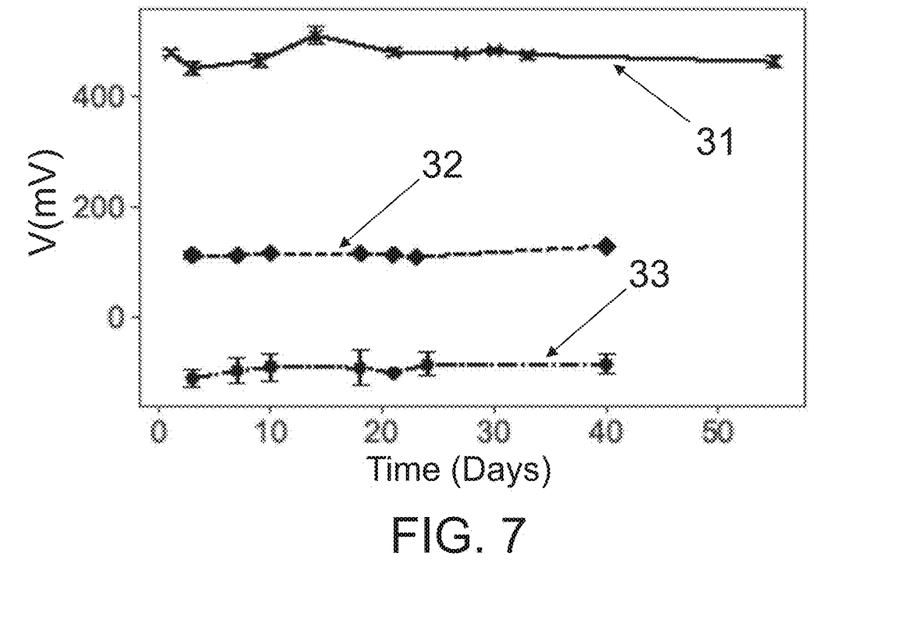
FIG. 7 is a graph of voltage drift over time of the three different sensors, measured independently, using the ion-selective electrode according to some embodiments of the invention.

FIG. 7 shows the voltage drift over time, shown in days, of the three sensors having the calibration curves as shown in FIG. 6, measured independently.

It appears clear that the voltage drift for all three sensors is very low over a 2 months period.

The sensor measuring $NO_3^-$, i.e., 31, comprising $Mn_3O_4$ within the transducer layer shows an irrelevant voltage drift over 50 days of use.

The sensor measuring $NH_4^+$, i.e., 32, and the one measuring $K^+$, i.e., 33, comprising $LiMn_2O_4$ within the transducer layer also show an irrelevant voltage drift over 40 days of use.

All sensors voltage drifts were measured at different concentrations depending on the ions so as to correspond to the typical lowest concentration of interest.

This concentration was for $NO_3^-$, 2 mg/L, for $K^+$, 0.5 mg/L and for $NH_4^+$, 0.05 mg/L.

All sensors display very low voltage drifts over an extended period, i.e., in the area of 200 µV/day.

This is a substantial improvement in decreasing the signal drift that is, for state of the art ion-selective sensors, in the area of 3 mV/day.

Figure 8:
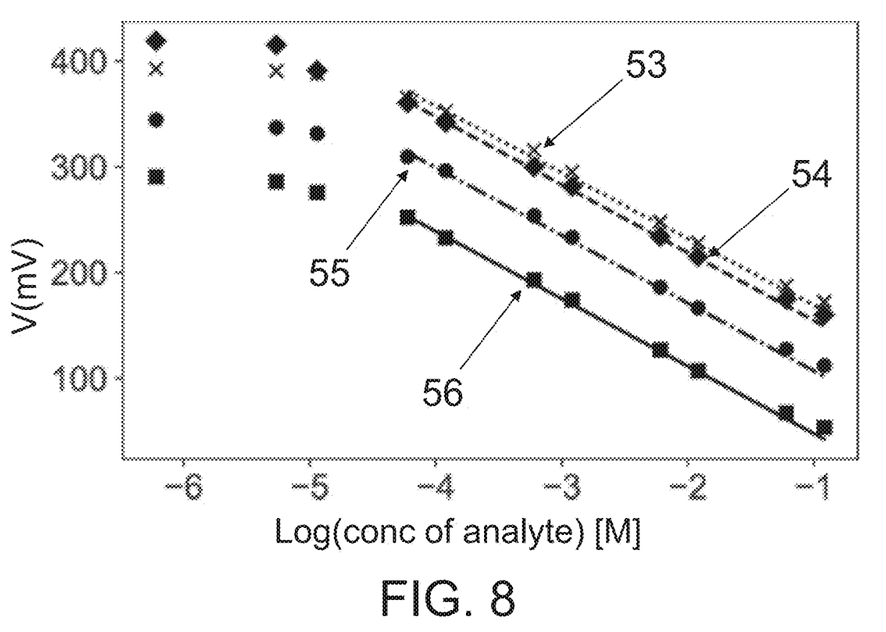
FIG. 8 is a graph of calibration curves of ion-selective electrode having four different transducer layers measuring the same analyte according to some embodiments of the invention.

FIG. 8 is a graph of calibration curves of ion-selective electrode having transducer layers comprising four different transition metal oxides.

The calibration curves of FIG. 8 relate to four different potentiometric sensors comprising the ion-selective electrode according to some embodiments of the invention and a reference electrode being an Ag/AgCl reference electrode.

The sensors measure the concentration of $NO_3^-$ at the interface of the ion-selective electrode and between the ion-selective electrode and the reference electrode.

The calibration curves 53, 54, 55 and 56 show log of concentration of $NO_3^-$ in the solution to be measured versus the voltage measured by four sensors having transducer layers comprising different transition metal oxides, i.e., $ZnFe_2O_4$, $Fe_3O_4$, $LiCO_2O_4$, $CoFe_2O_4$, respectively.

Figure 9:
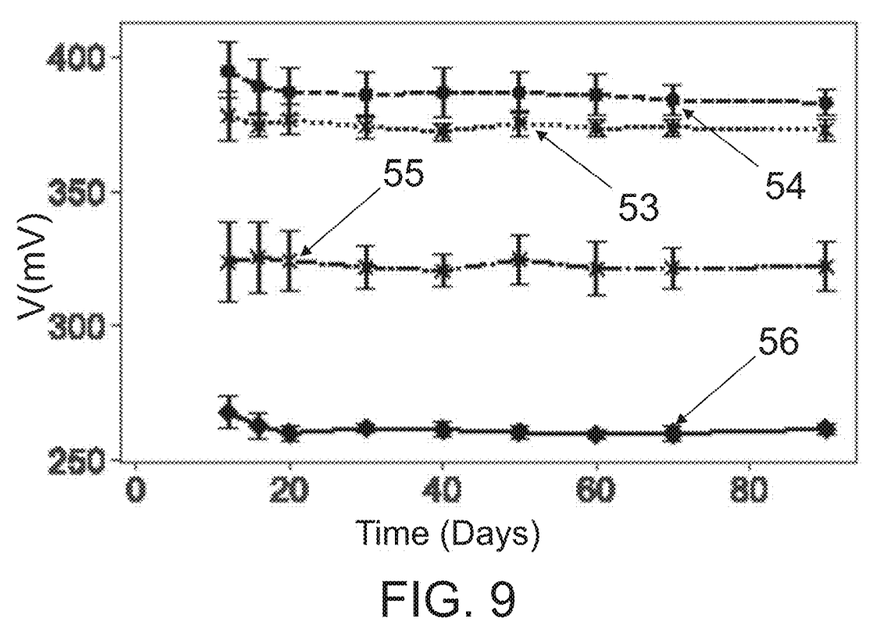
FIG. 9 is a graph of voltage drift over time of the four sensors using different ion-selective electrodes according to some embodiments of the invention.

FIG. 9 shows the voltage drift over time, shown in days, of the four sensors having the calibration curves as shown in FIG. 8.

From FIG. 9 it can be easily seen that the voltage drift for all four sensors is very low over a 90 days period.

Figure 10:
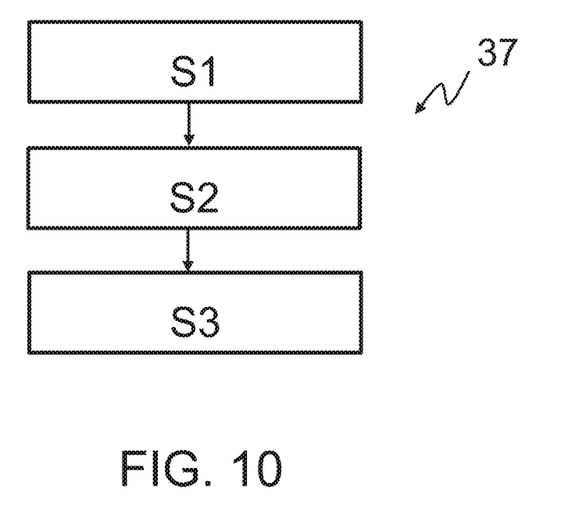
FIG. 10 is a flow chart of the method of producing an ion-selective electrode according to some embodiments of the second aspect of the invention.

FIG. 10 is a flow chart 37 of the method of producing an ion-selective electrode according to some embodiments of the second aspect of the invention.

The method, according to flow chart 37, of producing an ion-selective electrode comprises the steps of:
S1, encapsulating the conductive electrode;
S2, coating the encapsulated conductive electrode with the transducer layer;
S3, coating said transducer layer with the ion selective membrane.

Figure 11:
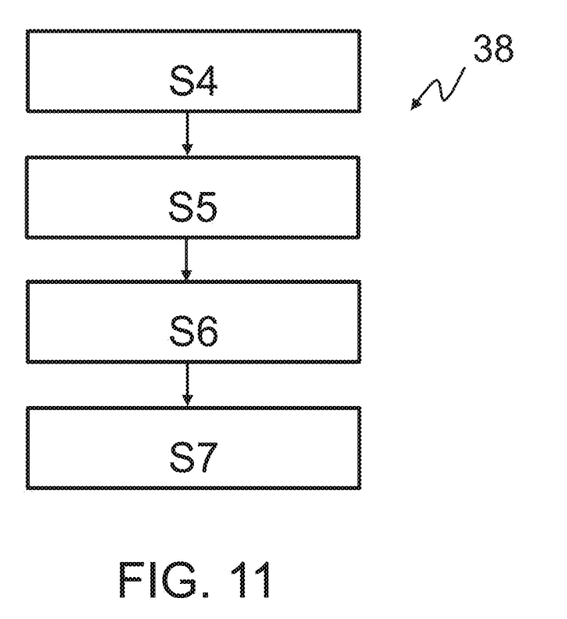
FIG. 11 is a flow chart of the method of producing an ion-selective electrode according to some other embodiments of the second aspect of the invention.

FIG. 11 is a flow chart 38 of the method of producing an ion-selective electrode according to some other embodiments of the second aspect of the invention.

The method, according to flow chart 37, of producing an ion-selective electrode comprises the steps of:
S4, encapsulating the conductive electrode;
S5, roughening and silanizing the means for encapsulating said conductive electrode;
S6, coating the encapsulated conductive electrode with the transducer layer;
S7, coating said transducer layer with the ion selective membrane.

The coating steps in relation to flow charts 37 and 38 may be blade coating, screen printing, spin-coating, spray coating or dip coating as described in the summary of the invention.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. In addition, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. An ion-selective electrode comprising:
an ion selective membrane configured to be in contact with a solution to be measured;
a transducer layer in contact with said ion selective membrane;
a conductive electrode in contact with said transducer layer; wherein said transducer layer comprises transition metal oxides; wherein said transition metal oxides comprise at least one transition metal in a mixed redox state, said at least one transition metal in a mixed redox state being $Mn^{2+}/Mn^{3+}$;
wherein said ion selective membrane is adapted for sensing one or more ions selected from $NO_3^-$, $NO_2^-$, $Cl^-$, $Br^-$, $HSO_4^-$, $SO_4^{2-}$, $H_2PO_4^-$, $HPO_4^{2-}$, $PO_4^{3-}$, $NH_4^+$, $H^+$.

2. An ion-selective electrode according to claim 1, wherein said at least one transition metal in a mixed redox state being $Mn^{2+}/Mn^{3+}$ $Mn_3O_4$.

3. An ion-selective electrode according to claim 1, wherein said transition metal oxides comprises solid-state transition metal oxides.

4. An ion-selective electrode according to claim 1, wherein said transition metal oxides are crystalline transition metal oxides.

5. An ion-selective electrode according to claim 1, wherein said transition metal oxides have the general formula $A_xB_yO_z$, wherein A is an element or a combination of elements of group 1, 7, 8, 9, 10, or 12, wherein B is an element or a combination of elements of group 7, 8, 9, or 10 and wherein x is a number being 0 or 1, y is a number being 1 or 2 or 31 and z is a number being 2 or 3 or 4.

6. An ion-selective electrode according to claim 1, further comprising means for encapsulating said conductive electrode.

7. An ion-selective electrode according to claim 6, wherein said means for encapsulating is or comprises a non-electronically, non-ionically conductive inert material covering said conductive electrode and leaving said conductive electrode exposed to said transducer layer.

8. An ion-selective electrode according to claim 7, further comprising a hydrophobic layer located between said transducer layer and said means for encapsulating said conductive electrode.

9. An ion-selective electrode according to claim 8, wherein said hydrophobic layer is located between said ion-selective membrane and said means for encapsulating said conductive electrode.

10. An ion-selective electrode according to claim 9, wherein said hydrophobic layer comprises silane, styrene, methacrylate, ethers, carboxylate, or acetate compounds or a combination thereof.

11. A method of producing an ion-selective electrode according to claim 1, said method comprising:
encapsulating said conductive electrode;
coating said encapsulated conductive electrode with said transducer layer;
coating said transducer layer with said ion selective membrane.

12. A method according to claim 11, said method further comprising:

roughening and silanizing said means for encapsulating said conductive electrode following said encapsulating said conductive electrode.

* * * * *